US005742627A

United States Patent [19]

Morita et al.

[11] Patent Number: 5,742,627

[45] Date of Patent: Apr. 21, 1998

[54] LASER OSCILLATOR USING A PLATE-TYPE HEAT EXCHANGER

[75] Inventors: Yasuyuki Morita; Kenji Mitsui, both of Minamitsuru-gun; Mitsuo Manabe, Hachioji, all of Japan

[73] Assignee: Fanuc, Ltd., Yamanashi, Japan

[21] Appl. No.: 50,431

[22] PCT Filed: Sep. 30, 1992

[86] PCT No.: PCT/JP92/01263

§ 371 Date: May 17, 1993

§ 102(e) Date: May 17, 1993

[87] PCT Pub. No.: WO93/07663

PCT Pub. Date: Apr. 15, 1993

[30] Foreign Application Priority Data

Apr. 10, 1991 [JP] Japan .................................... 3-257734

[51] Int. Cl.[6] .................................................. H01S 3/04

[52] U.S. Cl. ................................. 372/34; 372/35; 372/58

[58] Field of Search ................................. 372/34, 58, 35; 29/840.039, 890.054

[56] References Cited

U.S. PATENT DOCUMENTS

| | | | |
|---|---|---|---|
| 4,053,969 | 10/1977 | Bayard | 29/890.039 |
| 4,373,243 | 2/1983 | Nakamura | 29/890.039 |
| 4,610,014 | 9/1986 | Martinen et al. | 372/59 |
| 4,626,295 | 12/1986 | Sasaki et al. | 29/890.054 |
| 4,779,284 | 10/1988 | Nissen | 372/59 |
| 4,785,458 | 11/1988 | Kuzumoto et al. | 372/58 |
| 4,877,083 | 10/1989 | Saperstein | 165/176 |

FOREIGN PATENT DOCUMENTS

| | | | |
|---|---|---|---|
| 0 152 084 | 8/1985 | European Pat. Off. . | |
| 0 117 277 | 9/1983 | Germany . | |
| 3 603 818 | 8/1987 | Germany . | |
| 8 809 578 | 5/1988 | Germany . | |
| 50-140292 | 11/1975 | Japan . | |
| 61-124185 | 6/1986 | Japan . | |
| 62-119990 | 6/1987 | Japan | 372/58 |
| 3-64385 | 6/1991 | Japan . | |

*Primary Examiner*—Rodney B. Bovernick
*Assistant Examiner*—Robert E. Wise
*Attorney, Agent, or Firm*—Staas & Halsey

[57] ABSTRACT

A laser oscillator system has prolonged service lives of optical components thereof by preventing dust and the like from being produced from heat exchanger, the heat exchanger being reduced in size, and further, generates a higher laser beam output. The laser oscillator system uses a plate type heat exchanger as a cooling unit. The plate type heat exchanger can be made free of dust and the like, during a process of manufacturing it. Hence, it is possible to prevent inclusion of dust and the like from the heat exchanger into a laser oscillator and, thereby, markedly prolong the service lives of optical component parts. Further, the plate type heat exchanger is reduced in size and weight, which makes it possible to simplify a laser gas-circulating system. Further, influence of presence thereof, such as vibrations transmitted therefrom and the like, adversely affecting an electric discharge tube and the like, is reduced. Hence, it is possible to provide the plate type heat exchanger close to a laser gas outlet of the electric discharge tube and the like, which in turn makes it possible to increase a flow rate of laser gas by virtue of reduced frictional resistance the laser gas encounters, leading to an increased laser beam output.

12 Claims, 3 Drawing Sheets

20
23
33
34
100
22
41B
41A
100
41C
41
TO BLOWER 43

LASER OSCILLATOR USING A PLATE-TYPE HEAT EXCHANGER

TECHNICAL FIELD

The present invention relates to a laser oscillator system which is adapted to perform laser oscillation by exciting a laser gas in an electric discharge tube, which is forcibly cooled by a blower and a cooling unit, and more particularly to a laser oscillator system of this kind which uses a plate type heat exchanger as the cooling unit,

BACKGROUND ART

A gas laser oscillator system, such as a $CO_2$ laser, very efficiently generates a high output laser beam having excellent characteristics, so that when coupled with a numerical control unit, it is suitable for machining a workpiece into a complicated shape of high-speed etc., and hence it has now been in wide use, FIG, 4 schematically shows the arrangement of a conventional laser oscillator system. In FIG, 4, the laser oscillator system 1 is a $CO_2$ gas laser which uses $CO_2$ gas as a laser gas, and includes a laser oscillator 2, a laser beam machine 6, and a numerical control unit 7. The laser oscillator 2 is comprised of laser gas-circulating systems 31, 32 and a set of electric discharge tubes 21 and 22, respectively connected thereto therefor. The laser gas is forcibly circulated through the laser gas-circulating systems 31, 32 and the electric discharge tubes 21, 22 by a blower 43.

The laser gas supplied to the electric discharge tubes 21 and 22 is excited by high-frequency discharge caused therein by voltage from power supplies 23 and 24 for laser excitation. The laser gas heated to a high temperature due to excitation is supplied from a laser gas outlet 20 of the electric discharge tubes to a heat exchanger 410 arranged away from the laser gas outlet by a distance L, where it is cooled, and then delivered to the blower 43. The laser gas delivered from the blower 43 is cooled again by a heat exchanger 420 to remove heat generated by compression, and the resulting laser gas, the temperature of which is thus constantly controlled to a fixed value, is supplied to the electric discharge tubes 21 and 22.

The set of electric discharge tubes 21 and 22 has a total reflection mirror 25 and an output mirror 26 arranged on opposite sides of the set of electric discharge tubes 21, 22 to form a Fabry-Perot type oscillator which is adapted to amplify a laser beam generated by electric discharge and output part of the amplified laser beam to the outside. The laser beam emitted from the oscillator is deflected by a bender mirror 27, subsequently entering the laser beam machine 6, where it is used for machining a workpiece. The numerical control unit 7 controls the laser oscillator 2 and the laser beam machine 6 according to the programs stored therein.

In the laser oscillator system 1, the heat exchangers 410 and 420 as cooling units have been conventionally formed by fin type heat exchangers each of which is comprised of a fin type heat exchanger core and a hermetic box container, formed e.g. of aluminum casting, for enclosing the fin type heat exchanger core therein. The fin type heat exchanger operates to cool the laser gas by heat transfer from the laser gas flowing through the hermetic box container to the fin type core through which a coolant is caused to flow.

When the fin type heat exchanger is used in the laser oscillator system 1, however, inevitably, dust is produced from the fin type core itself and from the cast container enclosing the core. Particularly, a case may exist in which molding sand adhered to the cast container during casting of the container is separated off the casting surface into the laser gas. When such dust or other foreign matters are included in the laser gas, optical component parts (the total reflection mirror 25, the output mirror 26, etc.) used in the laser oscillator 2 are contaminated. This which requires replacement of these optical component parts, which are very expensive, or washing of them. Further, in the case of washing these optical component parts, the following problems arise:

(1) The laser oscillator system 1 has to be stopped for a long time period.

(2) The laser gas-circulating system 3 is disassembled and hence open, so that inclusion of new dust and the like is inevitable.

(3) It is necessary to re-adjust the whole optical system including the bender mirror 27, the laser beam machine 6, etc., which takes much time and requires a skilled operator.

Therefore, prevention of dust and the like being produced from the heat exchange is a very important problem to be solved for the laser oscillator system.

The above-mentioned fin type heat exchanger is low in efficiency of heat exchange per unit volume, and requires its fin type core to be arranged within the hermetic box container, so that the size and weight of the heat exchanger used are increased accordingly. Therefore, if the fin type heat exchanger is provided on the laser gas outlet side of the electric discharge tubes 21 and 22, the electric discharge tubes 21 and 22 are readily adversely affected by presence thereof, e.g. by transmission of vibrations therefrom. On the other hand, the electric discharge tubes 21 and 22 are under very delicate control to effect laser oscillation, and hence it is necessary to prevent them from being affected by such vibrations and the like. Therefore, in providing the fin type heat exchanger, the distance L from the laser gas outlet 20 to the fin type heat exchanger must be set to a large value. As a result, it is difficult to simplify the laser gas-circulating system 3.

Further, to obtain an increased flow rate of laser gas, which is effective in attaining a high output from the laser oscillator system, it is important to reduce the length of a path through which a high-temperature laser gas flows, to thereby diminish the frictional resistance that the gas encounters. This result because as the temperature of the laser gas increases, the viscosity thereof is higher, and further the volumetric flow rate thereof is higher, so that the longer the path through which the high-temperature gas flows, the greater the frictional resistance the laser gas encounters. However, as described hereinabove, if the fin type heat exchanger is used, the distance L between the electric discharge tubes 21, 22 and the heat exchanger 410 has to be set to a large value, and accordingly, the frictional resistance cannot be diminished. The therefor has been an obstacle to obtaining a high output from the laser oscillator system.

SUMMARY OF THE INVENTION

The present invention is made in view of the above circumstances, and it is an object of the invention to provide a laser oscillating system which is capable of prolonging the service lives of optical component parts used therein by preventing dust and the like from being produced from a heat exchanger.

It is another object of the invention to provide a laser oscillating system which is capable of attaining a reduced size of the heat exchanger.

It is still another object of the invention to provide a laser oscillating system which is capable of achieving a high laser beam output.

To attain the above objects, according to the invention, there is provided a laser oscillating system in which a laser gas forcibly cooled by a blower and a cooling unit is excited in an electric discharge tube for laser oscillation, which comprises a plate type heat exchanger arranged at a laser gas outlet of the electric discharge tube for cooling the laser gas excited in the electric discharge tube, and a blower arranged at a laser gas outlet of the plate type heat exchanger for producing a current of the laser gas cooled by the plate type heat exchanger.

The plate type heat exchanger is arranged at the laser gas outlet of the electric discharge tube for cooling the high-temperature laser gas excited in the electric discharge tube. The blower is arranged at the laser gas outlet of the plate type heat exchanger for producing a current of the laser gas for circulation in the system. Since the plate type heat exchanger is used as a cooling unit, it is possible to prevent dust and the like from being produced from the heat exchanger. Further, the heat exchanger can be implemented in reduced size. Additionally, the heat exchanger, thus reduced in size, can be arranged at a location close to the laser gas outlet of the electric discharge tube. This results in a reduced length of a path through which the high-temperature laser gas flows, whereby it is made possible to increase a flow rate of the laser gas by virtue of reduced frictional resistance the laser gas encounters and to thereby attain a high laser beam output.

BEST MODE OF CARRYING OUT THE INVENTION

An embodiment of the present invention will now be described with reference to the drawings.

Figure 1:
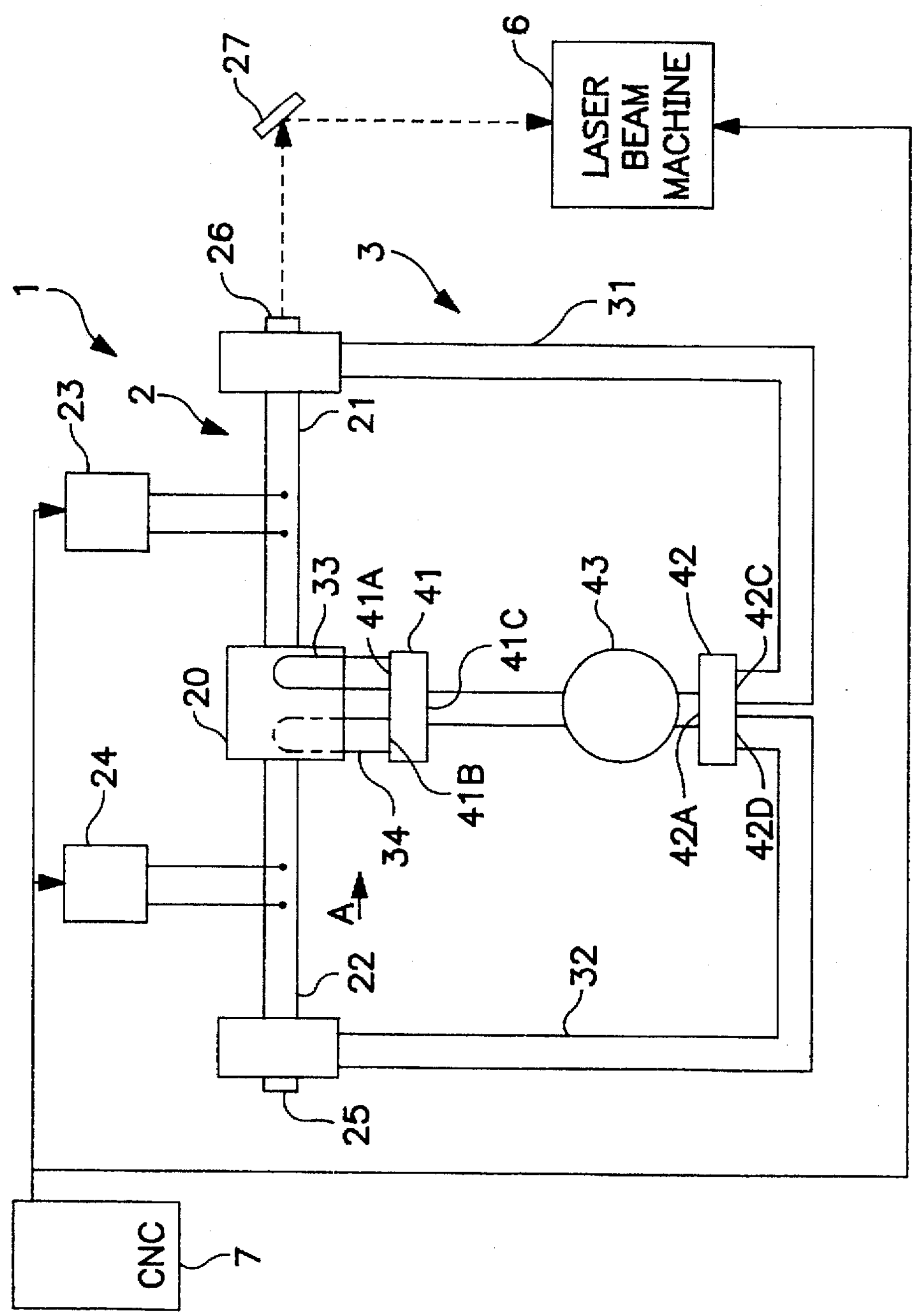
FIG. 1 is a diagram schematically showing the arrangement of a laser oscillator system according to the invention.

FIG. 1 schematically shows the arrangement of a laser oscillating system according to the invention. In FIG, 1, a gas laser oscillator system 1 is a $CO_2$ gas laser which uses a $CO_2$ gas as a laser gas, and includes a laser oscillator 2, a laser beam machine 6, and a numerical control unit 7. The laser oscillator 2 is comprised of a laser gas-circulating system 3 and electric discharge tubes 21 and 22, connected thereto. The laser gas is forcibly circulated through two laser gas return passages 31 and 32 of the laser gas-circulating system 3 and the electric discharge tubes 21 and 22 by a blower 43. In this connection, two more electric discharge tubes, not shown, are provided in parallel with the electric discharge tubes 21 and 22.

A plate type heat exchanger 41, which will be described in detail hereinbelow, is arranged at a location close to a laser gas outlet 20 of the electric discharge tubes 21 and 22. The laser gas supplied to the electric discharge tubes 21 and 22 is excited by high-frequency discharge caused therein by voltage from power supplies 23 and 24 for laser excitation. The laser gas, heated to a high temperature due to excitation, flows out from the laser gas outlet 20 into the plate type heat exchanger 41 via gas inlet ports 41A and 41B thereof. The high-temperature laser gas, cooled within the heat exchanger 41, flows out via a gas outlet port 41C thereof and is then drawn into the blower 43. A plate type heat exchanger 42 is provided on the outlet side of the blower 43 as well, and the laser gas delivered from the blower 43 flows into the plate type heat exchanger 42 via a gas inlet port 42A thereof. The laser gas is cooled again to remove heat generated by compression and then flows out via gas outlet ports 42C and 42D thereof to be supplied again to the electric discharge tubes 21 and 22. Thus, the laser gas is constantly cooled by the plate type heat exchangers 41 and 42 to a fixed temperature, and then supplied to the electric discharge tubes 21 and 22.

The set of electric discharge tubes 21 and 22 has a total reflection mirror 25 and an output mirror 26 arranged on opposite sides thereof to form a Fabry-Perot type oscillator which is adapted to amplify a laser beam generated by electric discharge and output part of the amplified laser beam to the outside. The laser beam emitted from the oscillator is deflected by a bender mirror 27, subsequently entering the laser beam machine 6, where it is used for machining a workpiece. The numerical control unit 7 controls the laser oscillator 2 and the laser beam machine 6 according to the programs stored therein.

Figure 2:
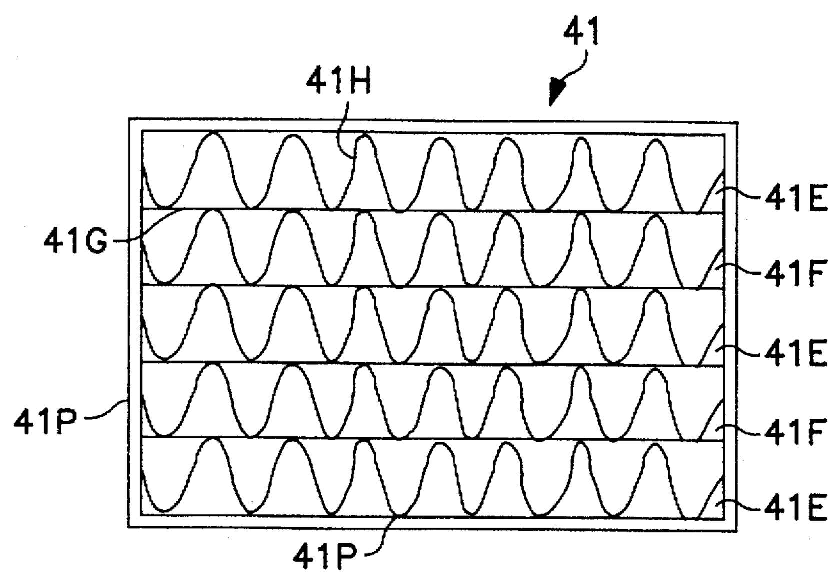
FIG. 2 is a diagram schematically showing the internal construction of a plate type heat exchanger.

FIG. 2 schematically shows the internal construction of a plate type heat exchanger. In FIG. 2, the plate type heat exchanger is presented in transverse cross-section. The plate type heat exchanger 41 is constructed such that coolant passages 41E and laser gas passages 41F, divided by thin plates 41G, are alternately formed one upon another, each of the passages 41E and 41F being provided with fins 41H. The laser gas, heated to a high temperature due to excitation in the electric discharge tubes, passes through the laser gas passages 41F while being subjected to heat exchange via the thin plates 41G and coolant flowing through the coolant passages 41E, for cooling. The heat exchange is promoted by presence of the fins 41H. The number of the passages 41E and 41F, as well as the height thereof can be selected as desired, and will be determined in view of cooling capability, frictional resistance, and manufacturing cost thereof. This plate type heat exchanger has a significantly improved cooling efficiency compared with a conventional fin type heat exchanger which is adapted to cool a laser gas drawn into a hermetic box container thereof, so that it can be greatly reduced in size to ½ to ⅕ of the size of a conventional type. Further, reduction of its size and no use of a cast container contribute to reducing the total weight of the laser oscillator system by approx. 10%.

The plate type heat exchanger 41 is assembled by brazing in a vacuum oven. More specifically, joints between adjacent parts of plates 41P forming an outer casing of the plate type heat exchanger 41, those between the plates 41P and the thin plates 41G, and those between the thin plates 41G and the fins 41H are formed by brazing, e.g. by the use of a copper material, whereby these component parts are assembled into a unit. Further, brazing is performed in a vacuum oven, so that dust and the like included into the interior of the plate type heat exchanger during manufacturing steps is almost completely burnt out during this step of brazing in the oven. In this connection, - 10 - substantially the same effects can be obtained even with plate type heat exchangers brazed in a reducing oven, such as an $H_2$ oven, or in an inert gas oven. Further, no casting, such as a container of a conventional fin type heat exchanger, is used in this plate type heat exchanger, and hence no molding sand is included therein. As a result, the plate type heat exchanger 41 produces a much smaller amount of dust and the like than a conventionally-used heat exchanger. Therefore, it can reduce an amount of dust occurring within the laser oscillator 2 by a large ratio of 80%, compared with the conventionally-used heat exchanger. Accordingly, contamination of the optical component parts of the laser oscillator 2 can be prevented, which results in markedly-prolonged service lives of the optical components.

Figure 3:
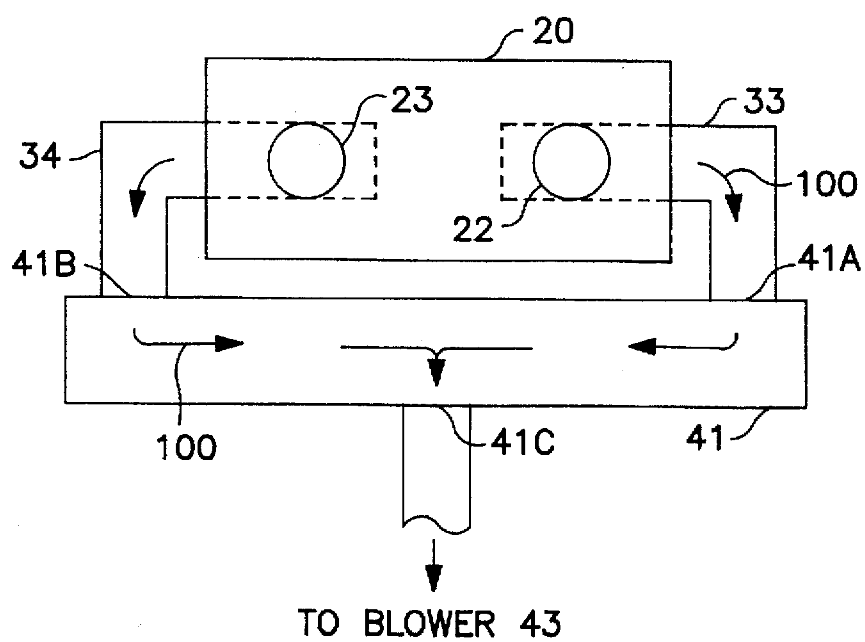
FIG. 3 is a diagram showing the plate type heat exchanger provided on a laser gas outlet side of electric discharge tubes.

FIG. 3 shows a plate type heat exchanger provided on the laser gas outlet side of the electric discharge tubes, as viewed in the direction of an arrow A appearing in FIG. 1. In FIG. 3, the plate type heat exchanger 41 is arranged close to the laser gas outlet 20, and the laser gas flows in the directions of arrows 100. Namely, the high-temperature laser gas within the electric discharge tube 22 and the like flows from the laser gas outlet 20 through L-type gas passages 33 and 34, into the plate type heat exchanger 41 via the gas-inlet ports 41A and 41B thereof, where it is cooled and then flows out via the gas outlet port 41C thereof.

Figure 4:
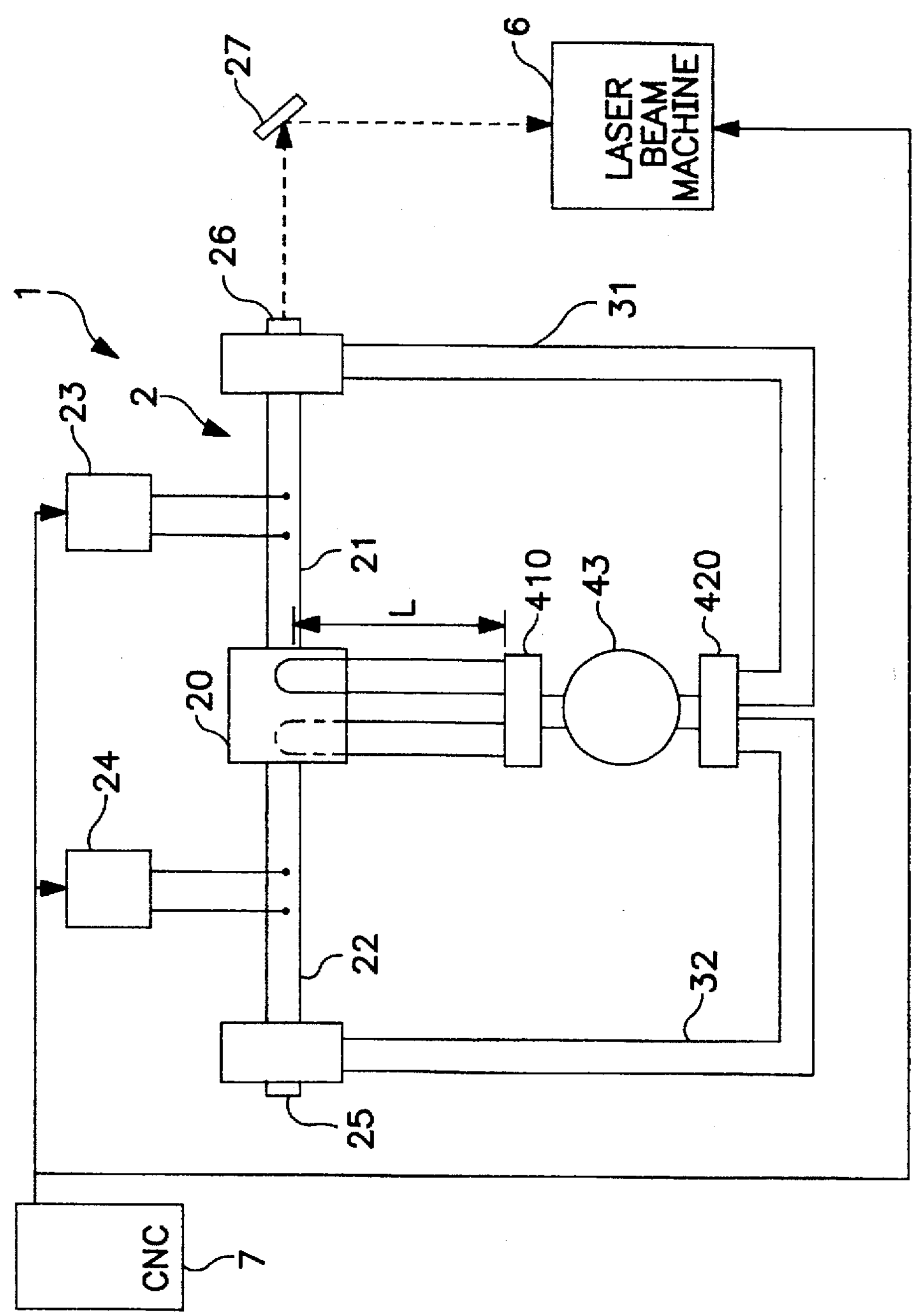
FIG. 4 is a diagram schematically showing the arrangement of a conventional laser oscillating system.

The length of the L-type gas passages 33 and 34 connecting between the laser gas outlet 20 of the electric discharge tube 22 and the like and the plate type heat exchanger 41 is considerably reduced compared with the length (L appearing in FIG. 4) of those used in the conventional system, which means that the plate type heat exchanger is arranged immediately below the electric discharge tube 22 and the like. Such arrangement is made possible by the use of the plate type heat exchanger 41, which is small in size and light in weight, as a heat exchanger, and provision of a plurality of laser gas inlet ports in the plate type heat exchanger. In other words, this arrangement is realized through the fact that the reduced size and weight of the heat exchanger diminish influence of vibrations thereof adversely affecting the electric discharge tube 22 and the like, and at the same time that the heat exchanger has the function of integrating separately supplied flows of the laser gas, which makes it most suitable for the construction of the laser oscillator system.

Thus, the reduced length of paths through which the high-temperature laser gas flows makes it possible to increase a flow rate of laser gas because of a diminished frictional resistance that the laser gas encounters, which results in an approximately 20% increase in the laser beam output.

In addition, although the plate type heat exchanger 41 in the above embodiment is constructed such that it has two gas inlet ports 41A and 41B provided in a manner corresponding to the electric discharge tube 22 and the like provided in parallel, and one gas outlet port 41C, this is not limitative. Instead this is a manner of provision of these gas inlet ports and each gas outlet port can be modified to fit the type of electric discharge tubes used and other installing conditions of the system. For instance, when the plate type heat exchanger 42 is provided on the outlet side of the blower 43 it is formed with one gas inlet port and two gas outlet ports.

As described heretofore, according to the present invention, a laser oscillator system is constructed such that a plate type heat exchanger is used as its cooling unit for cooling a laser gas, which makes it possible to prevent dust and the like from being produced from the heat exchanger, to thereby markedly prolong service lives of optical component parts of the system. Further, as the heat exchanger can be implemented in a smaller and lighter form, the laser gas-circulating system can be made more simple in construction and the laser oscillator system can be reduced in weight. Further, the heat exchanger reduced in size can be arranged close to a laser gas outlet of a electric discharge tube, and hence, the length of a path through which a high-temperature laser gas flows can be reduced. This makes it possible to increase a flow rate of the laser gas by virtue of a reduced frictional resistance that the laser gas encounters and, accordingly, leads to a higher laser beam output.

We claim:

1. A laser oscillator system in which laser gas, forcibly cooled, is excited in an electric discharge tube for laser oscillation, comprising:

a plate type heat exchanger connected to a laser gas outlet of said electric discharge tube by a plurality of L-type gas passages having a first predetermined length for cooling said laser gas when output from said electric discharge tube and integrating said laser gas into a single flow, wherein each L-type gas passage has a single bend between an input and an output thereof;

a blower connected to said plate type heat exchanger for producing a current of said laser gas cooled by said plate type heat exchanger; and a laser gas return passage having a second predetermined length greater than said first predetermined length and connected between said blower and said electric discharge tube for returning said current of cooled laser gas to said electric discharge tube.

2. A laser oscillator system according to claim 1, wherein said plate type heat exchanger is comprised of a manufactured unit of assembled component parts which have been brazed into said manufactured unit, in one of a vacuum oven and a reducing oven.

3. A laser oscillator system according to claim 2, wherein said component parts have been brazed in an $H_2$ oven.

4. A laser oscillator system according to claim 2, wherein said component parts have been brazed in an inert gas oven.

5. A laser oscillator system according to claim 1, wherein said plate type heat exchanger is provided on a laser gas outlet of said blower.

6. A laser oscillator system which forcibly cools laser gas in an electric discharge tube, comprising:

a first L-type gas passage having a predetermined length and connected to the electric discharge tube for transmitting laser gas, wherein said first L-type gas passage has a single bend between an input and an output thereof;

a plate type heat exchanger which cools laser gas received from the first L-type gas passage;

a blower which induces a flow of the cool laser gas from said first plate type heat exchanger and through said blower; and a first laser gas return passage having a predetermined length greater than the predetermined length of said first L-type gas passage, which receives the cool laser gas from the blower and transmits the cool laser gas to the electric discharge tube.

7. The laser oscillator system according to claim 6, further comprising:

a second plate type heat exchanger connected between the blower and the first laser gas return passage which further cools the laser gas received from the blower.

8. The laser oscillator system according to claims 6, further comprising:

a second L-type gas passage having a predetermined length less than the length of said first laser gas return passage and transmitting laser gas from the electric discharge tube to the plate type heat exchanger, wherein said second L-type gas passage has a single bend between an input and an output thereof.

9. The laser oscillator system according to claim 6, further comprising:

a second laser gas return passage having a predetermined length greater than the predetermined length of said first L-type gas passage, which receives the cool laser gas from the blower and transmits the cool laser gas to the electric discharge tube.

10. A laser oscillator system which forcibly cools laser gas, comprising:

an electric discharge tube which excites laser gas in response to an electric discharge;

a first gas passage having a first length which supplies cool laser gas to the electric discharge tube;

a first plate type heat exchanger which cools the laser gas before entry into the first laser gas passage;

a blower connected to the first plate type heat exchanger which induces flow of the cool laser gas through said first plate type heat exchanger, said first gas passage, and into said electric discharge tube;

a second laser gas passage having a second length and connected to said blower;

a second plate type heat exchanger connected to said second laser gas passage and providing a source of cool laser gas; and a third L-type laser gas passage having a third length and connected between said electric discharge tube and said second plate type heat exchanger to thereby supply laser gas from said electric discharge tube to said second plate type heat exchanger, wherein said third length is shorter than said second length and said third L-type gas passage has a single bend between an input and an output thereof.

11. The laser oscillator system according to claim 10, further comprising:

a fourth L-type laser gas passage having a fourth length and connected between said electric discharge tube and said second plate type heat exchanger, wherein said fourth length is shorter than said second length and said fourth L-type gas passage has a single bend between an input and an output thereof.

12. The laser oscillator system according to claim 10, further comprising:

a second plate type heat exchanger connected between the blower and the first laser gas passage which further cools laser gas received from the blower.

* * * * *